(12) United States Patent
Whyman et al.

(10) Patent No.: US 11,155,760 B2
(45) Date of Patent: Oct. 26, 2021

(54) PROCESS FOR NATURAL GAS PRODUCTION

(71) Applicant: Honeywell International Inc., Morristown, NJ (US)

(72) Inventors: William J. Whyman, Collinsville, OK (US); David Farr, Tulsa, OK (US); Jan De Ren, Surrey (GB); Manu Gustaaf Rosa Van Leuvenhaege, Surrey (GB)

(73) Assignee: Honeywell International Inc., Morristown, NJ (US)

(*) Notice: Subject to any disclaimer, the term of this patent is extended or adjusted under 35 U.S.C. 154(b) by 360 days.

(21) Appl. No.: 16/398,926

(22) Filed: Apr. 30, 2019

(65) Prior Publication Data

US 2020/0347311 A1   Nov. 5, 2020

(51) Int. Cl.
*C10L 3/10* (2006.01)
*B01D 53/22* (2006.01)
*B01D 53/14* (2006.01)

(52) U.S. Cl.
CPC .......... *C10L 3/102* (2013.01); *B01D 53/1456* (2013.01); *B01D 53/225* (2013.01); *B01D 53/229* (2013.01); *C10L 2200/04* (2013.01)

(58) Field of Classification Search
CPC combination set(s) only.
See application file for complete search history.

(56) References Cited

U.S. PATENT DOCUMENTS

| | | |
|---|---|---|
| 5,411,721 A | 5/1995 | Doshi et al. |
| 5,753,011 A | 5/1998 | Sircar et al. |
| 5,997,594 A | 12/1999 | Edlund et al. |
| 7,790,030 B2 | 9/2010 | Schwartz et al. |
| 8,454,731 B2 | 6/2013 | Xu |
| 8,575,414 B2 | 11/2013 | Liu et al. |
| 8,669,294 B2 | 3/2014 | Lien et al. |
| 9,321,004 B2 | 4/2016 | Broderick et al. |
| 10,913,027 B2* | 2/2021 | Hirata .................. B01D 53/226 |
| 2013/0131199 A1* | 5/2013 | Lien ....................... C01B 3/342 |
| | | 518/702 |

(Continued)

FOREIGN PATENT DOCUMENTS

| | | |
|---|---|---|
| CN | 101525120 A | 9/2009 |
| CN | 103108831 A | 5/2013 |

(Continued)

OTHER PUBLICATIONS

International Search Report for corresponding PCT Application No. PCT/US2020/030343 dated Jul. 9, 2020.

(Continued)

*Primary Examiner* — Kaity V Chandler (57) ABSTRACT

Processes for natural gas production are described. The processes involve combining a membrane separation system and a thermal oxidizing system. The high and low hydrocarbon permeate streams from the membrane separation system are introduced into the thermal oxidizing system separately. The high hydrocarbon permeate stream provides fuel for the thermal oxidizing system, allowing a reduction in external fuel usage. The reduction in total fuel required yields increased gas production for the total plant. A solvent based acid gas removal system can optionally be included.

20 Claims, 4 Drawing Sheets

(56) References Cited

U.S. PATENT DOCUMENTS

| | | | | |
|---|---|---|---|---|
| 2015/0158795 | A1* | 6/2015 | Wynn | C07C 7/144 |
| | | | | 585/809 |
| 2016/0090910 | A1* | 3/2016 | Ploeger | B01D 53/229 |
| | | | | 60/783 |
| 2016/0184769 | A1* | 6/2016 | Kulkarni | B01D 53/226 |
| | | | | 95/53 |
| 2017/0157556 | A1* | 6/2017 | Karode | B01D 71/56 |
| 2018/0250627 | A1* | 9/2018 | Zick | B01D 53/225 |
| 2018/0327263 | A1* | 11/2018 | De Ren | C01B 3/36 |
| 2019/0030482 | A1* | 1/2019 | Ding | B01D 53/228 |
| 2019/0060835 | A1* | 2/2019 | Ding | B01D 53/002 |
| 2019/0224617 | A1* | 7/2019 | Mitariten | C07C 7/005 |
| 2020/0347311 | A1* | 11/2020 | Whyman | B01D 53/1462 |

FOREIGN PATENT DOCUMENTS

| | | | | | |
|---|---|---|---|---|---|
| CN | 107922865 | A | * | 4/2018 | C10L 3/103 |
| DE | 69835503 | T2 | | 4/2007 | |
| HK | 1019413 | A1 | | 2/2000 | |
| RU | 2417503 | C1 | | 4/2011 | |
| TW | 354263 | B | | 3/1999 | |
| WO | 2010006910 | A1 | | 1/2010 | |
| WO | WO-2015071575 | A1 | * | 5/2015 | C10L 3/08 |
| WO | WO-2016076091 | A | * | 5/2016 | B01D 53/225 |

OTHER PUBLICATIONS

Written Opinion for corresponding PCT Application No. PCT/US2020/030343 completed on Jul. 2, 2020.

* cited by examiner

PROCESS FOR NATURAL GAS PRODUCTION

BACKGROUND

Current systems have the gas separation membrane operation and the thermal oxidizer operation separated. This arrangement does not allow for any process integration to increase the overall gas production of the facility.

Furthermore, current solvent based acid gas removal technology for natural gas streams treatment has an inherent hydrocarbon loss associated with it, typically about 2-5%. In addition, solvent based acid gas removal technologies are currently not addressing the disposal of the formed acid gas streams. Increased regulation of gas streams exhausted to the atmosphere can be expected in the future.

Therefore, there is a need for methods of operating integrated membrane separation systems and thermal oxidation systems. There is also a need for incorporating methods of operating integrated solvent based acid gas removal systems with the integrated membrane separation systems and thermal oxidation systems in order to reduce hydrocarbon loss and the release of harmful gases to the atmosphere, as increase the total treatment block efficiency in terms of utility consumption and losses.

DESCRIPTION OF THE INVENTION

By combining the membrane separation system and the thermal oxidizing system together, the inherent design of the membrane separation system can be used to modify the waste characteristics going to the thermal oxidizing system. This allows the thermal oxidizing system to operate in a completely different manner, which drastically reduces the fuel usage for the combustion process.

The fuel that is saved is added to the produced gas total to increase the overall gas production. This also reduces the size of the thermal oxidizing system, and consequently the cost. The weight is also reduced for those systems installed on floating production, storage, and offloading barges (FPS0/Barges).

Current membrane separation systems gather permeate gas from multiple locations and combine it into one header for delivery to the thermal oxidizing system for destruction. The thermal oxidizing system requires 20% or higher of the total hydrocarbon content be added as fuel to meet emission requirements for destruction. If the permeate connections are segregated to high hydrocarbon content and low hydrocarbon content, then the thermal oxidizing system can be optimized to reduce fuel usage to virtually none. This results in a size and cost reduction for the thermal oxidizing system. In addition, the reduction in total fuel required results in an increase in produced gas for the total plant.

By integrating the thermal oxidizing system with solvent based acid gas removal technology (chemical or physical), the lost hydrocarbons can be utilized for thermal destruction of the formed waste streams, thereby reducing OSBL fuel gas requirements. Additionally, the generated heat energy in the combustion section can be partially recuperated via a waste heat recovery boiler, thereby producing either steam or hot oil, which can be used in the reboiler section of some acid gas removal systems, as also in other locations of the acid gas removal system. Producing steam and/or hot oil inside battery limits (ISBL) reduces the dependence of outside battery limits (OSBL) utilities of the acid gas removal system.

One aspect of the invention is a process for natural gas purification. In one embodiment, the process comprises: passing a natural gas feed stream to a membrane separation system to separate the natural gas feed stream into a first permeate gas stream having a first hydrocarbon concentration, a second permeate gas stream having a second hydrocarbon concentration, the first concentration being higher than the second hydrocarbon concentration, and a purified natural gas stream; introducing the first permeate gas stream into a thermal oxidizing system at a first position, the thermal oxidizing system comprising a combustion chamber with a fuel gas inlet, a combustion air inlet, two or more permeate stream inlets, and a burner positioned in the combustion chamber; introducing the second permeate gas stream to the thermal oxidizing unit at a second position; and recovering the purified natural gas stream.

In some embodiments, the thermal oxidizing system uses less fuel gas than a thermal oxidizing unit in which a single permeate gas stream is introduced.

In some embodiments, the thermal oxidizing unit is smaller than a thermal oxidizing unit in which a single permeate gas stream is introduced.

In some embodiments, the membrane separation system includes two or more membrane separation units.\

In some embodiments, the process further comprises: removing acid gas from the purified natural gas stream using a solvent based acid gas removal process to form a purified natural gas product stream and an acid gas stream; passing the acid gas stream to the thermal oxidizing unit; and wherein recovering the purified natural gas stream comprises recovering the purified natural gas product stream.

In some embodiments, removing the acid gas from the purified natural gas stream comprises treating the purified natural gas stream in a chemical solvent based acid gas removal process.

In some embodiments, removing the acid gas from the purified natural gas stream comprises treating the purified natural gas stream in a physical solvent based acid gas removal process.

In some embodiments, removing acid gas from the purified natural gas stream using the solvent based acid gas removal process to form the purified natural gas product stream and the acid gas stream comprises removing acid gas from the purified natural gas stream using the solvent based acid gas removal process to form the purified natural gas product stream, an acid gas stream, and a hydrocarbon off gas stream, the process further comprising: passing the hydrocarbon off-gas stream to the thermal oxidizing unit.

In some embodiments, the process further comprises recovering waste heat from the thermal oxidizing unit.

In some embodiments, the recovered waste heat is used in an acid gas removal process.

In some embodiments, the recovered waste heat is used in a membrane preheater section of the membrane separation system.

In some embodiments, the process further comprises at least one of: sensing at least one parameter of the process and generating a signal or data from the sensing; generating and transmitting a signal; or generating and transmitting data.

Another aspect of the invention is a process for natural gas purification. In one embodiment, the process comprises: treating a natural gas feed stream in a solvent based acid gas removal system to form a purified natural gas stream and an acid gas stream; passing the purified natural gas stream to a membrane separation system to separate the purified natural gas stream into a first permeate gas stream having a first hydrocarbon concentration, a second permeate gas stream having a second hydrocarbon concentration, the first concentration being higher than the second concentration, and a purified natural gas product stream; introducing the first permeate gas stream into a thermal oxidizing unit at a first position, the thermal oxidizing unit comprising a chamber, a burner positioned in the chamber, a fuel gas inlet, a combustion air inlet, and two or more permeate stream inlets; introducing the second permeate gas stream to the thermal oxidizing unit at a second position; passing the acid gas stream to the thermal oxidizing unit; and recovering the purified natural gas product stream.

In some embodiments, the thermal oxidizing unit uses less fuel gas than a thermal oxidizing unit in which a single permeate gas stream is introduced.

In some embodiments, the thermal oxidizing unit is smaller than a thermal oxidizing unit in which a single permeate gas stream is introduced.

In some embodiments, the membrane separation system includes two or more membrane separation units.

In some embodiments, the solvent based acid gas removal system comprises a chemical solvent based acid gas removal system.

In some embodiments, the solvent based acid gas removal system comprises a physical solvent based acid gas removal system.

In some embodiments, treating the natural gas feed stream to the solvent based acid gas removal system to form the purified natural gas stream and the acid gas stream comprises removing acid gas from the natural gas feed stream using the solvent based acid gas removal system to form the purified natural gas product stream, an acid gas stream, and a hydrocarbon off gas stream, the process further comprising: passing the hydrocarbon off-gas stream to the thermal oxidizing unit.

In some embodiments, the process further comprises: recovering waste heat from the thermal oxidizing unit; and one or more of: using the recovered waste heat in the solvent based acid gas removal system; or using the recovered waste heat in a membrane preheater section of the membrane separation system.

Figure 1:
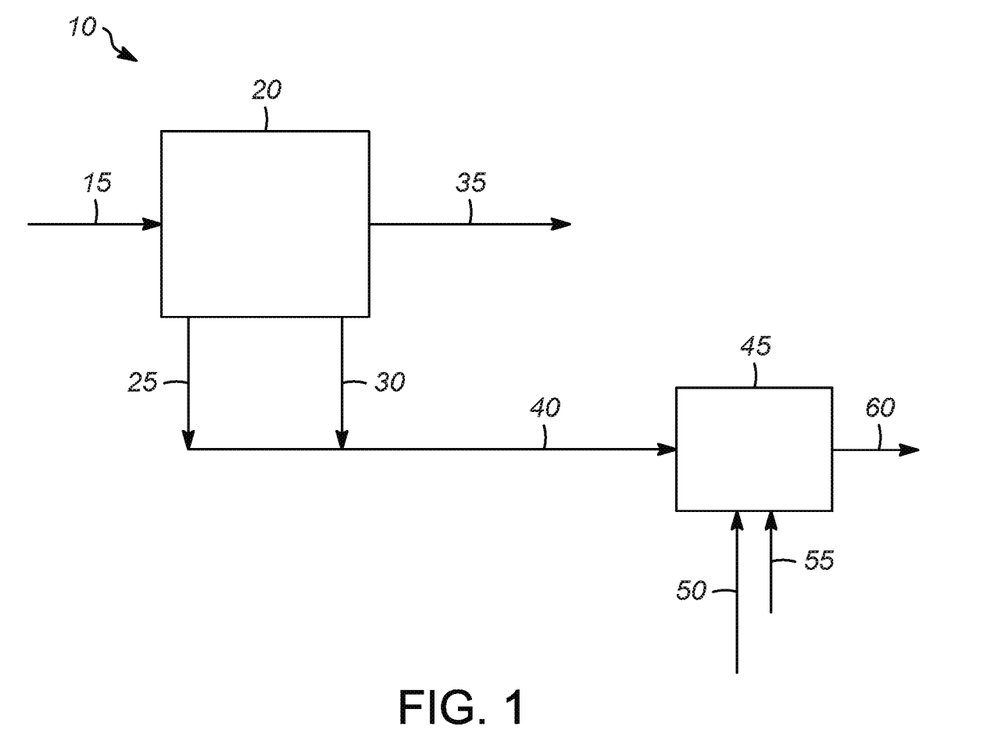
FIG. 1 is an illustration of an existing membrane separation system and thermal oxidation system.

FIG. 1 illustrates a typical membrane separation process 10. A natural gas feed stream 15 is sent to the membrane separation system 20. Natural gas feed stream 15 may comprise 50 to 75 mol % methane and other hydrocarbons, 25 to 50 mol % $CO_2$, and trace amounts of nitrogen and oxygen.

The membrane separation system 20 may comprise one, two, or more membrane separation units. The natural gas feed stream 15 is separated into a first permeate gas stream 25, a second permeate gas stream 30, and a purified natural gas stream 35 in the membrane separation system 20. The first permeate gas stream 25 has a higher hydrocarbon content than the second permeate gas stream 30. First permeate stream 20 may comprise 13 to 22 mol % methane and other hydrocarbons, 78 to 87 mol % $CO_2$, and trace amounts of nitrogen and oxygen. Second permeate stream 30 may comprise 4 to 8 mol % methane and other hydrocarbons, 92 to 96 mol % $CO_2$, and trace amounts of nitrogen and oxygen.

The membrane separation system 20 may comprise one, two, or more membrane separation units. The natural gas feed stream 15 is separated into a first permeate gas stream 25, a second permeate gas stream 30, and a purified natural gas stream 35 in the membrane separation system 20. The first permeate gas stream 25 has a higher hydrocarbon content than the second permeate gas stream 30. First permeate stream 25 may comprise 13 to 22 mol % methane and other hydrocarbons, 78 to 87 mol % $CO_2$, and trace amounts of nitrogen and oxygen. Second permeate gas stream 30 may comprise 4 to 8 mol % methane and other hydrocarbons, 92 to 96 mol % $CO_2$, and trace amounts of nitrogen and oxygen.

The first permeate gas stream 25 and the second permeate gas stream 30 are combined into combined permeate gas stream 40. The combined permeate gas stream 40 has a hydrocarbon content between that of the first permeate gas stream 25 and the second permeate gas stream 30. Combined permeate gas stream 40 may comprise 10 to 12 mol % methane and other hydrocarbons, 88 to 90 mol % $CO_2$, and trace amounts of nitrogen and oxygen, for example.

The combined permeate gas stream 40 is sent to the thermal oxidizing system 45. The thermal oxidizing system 45 includes a combustion chamber with a burner, a single permeate gas inlet, a fuel gas inlet, and a combustion gas inlet. Fuel gas stream 50 and combustion gas stream 55 are fed to the thermal oxidizing system 45, and the hydrocarbons in the combined permeate gas stream 40 are combusted. Fuel gas stream 50 may comprise 100 mol % methane and other hydrocarbons. Combustion gas stream 55 may comprise 79 mol % nitrogen and 21 mol % oxygen, for example.

The flue gas stream 60 may comprise 0 mol % methane and other hydrocarbons, 30 to 40 mol % $CO_2$, 7 to 11 mol % water, 45 to 55 mol % nitrogen, and 3 to 4 mol % oxygen.

Purified natural gas stream 35 may comprise 95 to 97 mol % methane and other hydrocarbons, 3 to 5 mol % $CO_2$, and trace amounts of nitrogen and oxygen.

Figure 2:
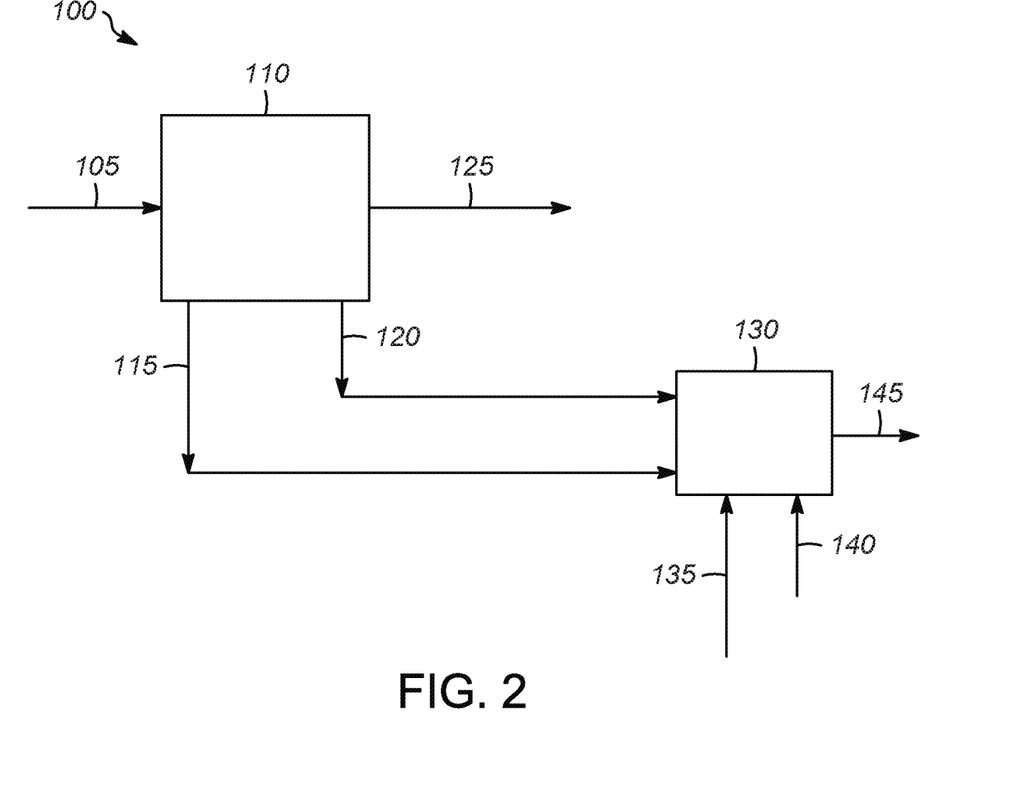
FIG. 2 is one embodiment of an integrated membrane separation system and thermal oxidation system.

FIG. 2 illustrates one embodiment of the natural gas purification process 100 of the present invention. This process can be used for bulk removal of $CO_2$ from natural gas, for example.

A natural gas feed stream 105 is sent to the membrane separation system 110. Natural gas feed stream 105 may comprise 50 to 75 mol % methane and other hydrocarbons, 25 to 50 mol % $CO_2$, and trace amounts of nitrogen and oxygen.

The membrane separation system 110 may comprise one, two, or more membrane separation units. Each membrane separation unit can have one or more membrane elements. If there is only one membrane separation unit, it will have two or more membrane elements.

The natural gas feed stream 105 is separated into a first permeate gas stream 115, a second permeate gas stream 120, and a purified natural gas stream 125 in the membrane separation system 110. The first permeate gas stream 115 has a higher hydrocarbon content than the second permeate gas stream 120. The terms "first permeate gas stream" and "second permeate gas stream" do not designate a particular spatial relationship, but are merely used to distinguish the two streams. What is important is that there are two (or more) streams which have different concentrations, and that the streams are introduced into the thermal oxidizing system in different places.

First permeate gas stream 115 may comprise 13 to 22 mol % methane and other hydrocarbons, 78 to 87 mol % $CO_2$, and trace amounts of nitrogen and oxygen. Second permeate gas stream 120 may comprise 4 to 8 mol % methane and other hydrocarbons, 92 to 96 mol % $CO_2$, and trace amounts of nitrogen and oxygen.

The first permeate gas stream 115 and the second permeate gas stream 120 are maintained as separate streams and sent to the thermal oxidizing system 130. The thermal oxidizing system 130 includes a combustion chamber with a burner, two (or more) permeate gas inlets, a fuel gas inlet, and a combustion gas inlet. Fuel gas stream 135 and combustion gas stream 140 are fed to the thermal oxidizing system 130. Fuel gas stream 135 may comprise 100 mol % methane and other hydrocarbons. Combustion gas stream 140 may comprise 79 mol % nitrogen and 21 mol % oxygen, for example. The hydrocarbons in the first permeate gas stream 115 are used as a source of fuel for the burner, consequently reducing the amount of external fuel gas required for operating the thermal oxidizing system 130.

The flue gas stream 145 may comprise 0 mol % methane and other hydrocarbons, 30 to 40 mol % $CO_2$, 7 to 11 mol % water, 45 to 55 mol % nitrogen, and 3 mol % oxygen.

Purified natural gas stream 125 may comprise 95 to 97 mol % methane and other hydrocarbons, 3 to 5 mol % $CO_2$, and trace amounts of nitrogen and oxygen.

Figure 3:
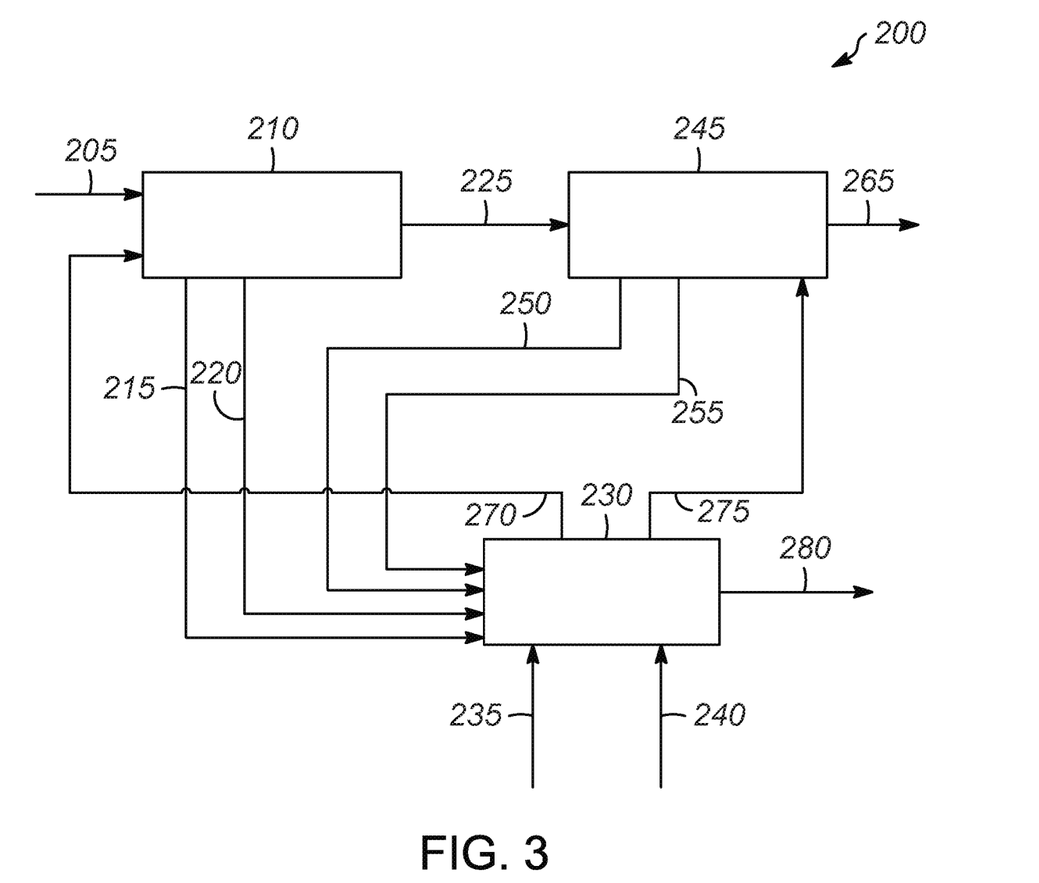
FIG. 3 is one embodiment of an integrated membrane separation system, acid gas removal system, and thermal oxidation system.

FIG. 3 illustrates another embodiment of the natural gas purification process 200 of the present invention in which the membrane separation system 210 is combined with a solvent based acid gas removal system 245. The process shown in FIG. 3 could be used to purify liquefied natural gas (LNG) or for stringent pipeline gas specifications.

A natural gas feed stream 205 is sent to the membrane separation system 210. For example, the natural gas feed stream 305 may comprise 50 to 95 mol % methane and other hydrocarbons, 5 to 50 mol % $CO_2$, and trace amounts of $H_2S$, nitrogen, and oxygen.

The membrane separation system 210 may comprise one, two, or more membrane separation units.

The natural gas feed stream 205 is separated into a first permeate gas stream 215, a second permeate gas stream 220, and a purified natural gas stream 225 in the membrane separation system 210. The first permeate gas stream 215 has a higher hydrocarbon content than the second permeate gas stream 220. For example, the first permeate gas stream 215 may comprise 13 to 22 mol % methane and other hydrocarbons, 78 to 87 mol % $CO_2$, and trace amounts of $H_2S$, nitrogen and oxygen. The second permeate gas stream 220 may comprise 4 to 8 mol % methane and other hydrocarbons, 92 to 96 mol % $CO_2$, and trace amounts of $H_2S$, nitrogen and oxygen. The purified natural gas stream 325 from the acid gas removal system 310 may comprise 50 to 95 mol % methane and other hydrocarbons, 5 to 50 mol % $CO_2$, and trace amounts of $H_2S$, nitrogen and oxygen.

The first permeate gas stream 215 and the second permeate gas stream 220 are maintained as separate streams and sent to the thermal oxidizing system 230. The thermal oxidizing system 230 includes a combustion chamber with a burner, two (or more) permeate gas inlets, a fuel gas inlet, and a combustion gas inlet. Fuel gas stream 235 and combustion gas stream 240 are fed to the thermal oxidizing system 230. Fuel gas stream 335 may comprise 100 mol % methane and other hydrocarbons. Combustion gas stream 340 may comprise 79 mol % nitrogen and 21 mol % oxygen, for example. The hydrocarbons in the first permeate gas stream 215 are used as a source of fuel for the burner, consequently reducing the amount of external fuel gas required for operating the thermal oxidizing system 230.

In this embodiment, the purified natural gas stream 225 is sent to the solvent based acid gas removal system 245. The acid gas removal system 245 can be any system that removes acid gas, including but not limited to, chemical solvent based acid gas removal systems, physical solvent based acid gas removal systems, or combinations thereof. Suitable chemical solvent based acid gas removal systems include, but are not limited to, amine treatment, and hot potassium carbonate treatment. For amine treatment, the system would typically include an amine absorber and an amine stripper, along with associated equipment, as is known in the art. See, for example, U.S. Pat. Nos. 8,454,731, 9,334,455. Suitable physical solvent based acid gas removal systems include, but are not limited to, processes using a solvent comprising a mixture of dimethyl ethers of polyethylene glycol (Selexol is the tradename for this solvent) or a solvent comprising refrigerated methanol (the Rectisol (tradename) process) to remove sulfur compounds and/or $CO_2$ from gas streams. See, for example, U.S. Pat. No. 9,321,004.

In either case, one or more acid gas streams 250, 255 can be fed to the thermal oxidizing system 230. The content of acid gas streams 250, 255 will depend on the acid gas removal system 245 used. For example, acid gas stream 250 may be a flash gas stream comprising 100 mol % methane and other hydrocarbons, and trace amounts of $CO_2$, $H_2S$, nitrogen, and oxygen. Acid gas stream 255 may be an acid gas $CO_2$ stream comprising 0.1 to 1 mol % methane and other hydrocarbons, 92 to 96 mol % $CO_2$, 5 to 8 mol % water, and trace amounts of $H_2S$, nitrogen, and oxygen.

The purified natural gas product stream 265 can be recovered. The purified natural gas product stream 265 may comprise 97 to 99.9 mol % methane and other hydrocarbons, 0.1 to 3 mol % $CO_2$, and trace amounts of $H_2S$, nitrogen and oxygen.

The flue gas stream 280 may comprise 0 mol % methane and other hydrocarbons, 30 to 40 mol % $CO_2$, 7 to 11 mol % water, 45 to 55 mol % nitrogen, and 3 mol % oxygen.

In addition, waste heat from the thermal oxidizing system 230 can be used as a source of heat for other parts of the process or other parts of the complex. The hot flue gas can be used directly for heating, or it can be used to make stream or to heat oil. For example, waste heat stream 270 can be used to heat the membrane preheater section of the membrane separation system 210. Alternatively, waste heat stream 275 can be used in the acid gas removal system 245 as a source of heat for column reboilers, for example. The use of the waste heat from the thermal oxidizing system 230 reduces the overall OSBL utility (e.g., steam, and/or hot oil) requirements for the complex.

Although amine absorption technology can achieve almost complete $CO_2$ removal, typically about 1% of the methane gas being treated is lost with the amine plant's $CO_2$ vent gas stream, and another 1-4% is lost if methane is used as fuel for the reboiler of the amine stripper, making the total hydrocarbon loss about 2-5%. By integrating the thermal oxidizing system with the solvent based acid gas removal system, the fuel for the reboiler is reduced or eliminated. In addition, the 1% loss of methane in the $CO_2$ acid gas can be used as calorific value in the thermal oxidizing system. The integration can be realize with every type of amine guard system, including, but not limited to, flash only, conventional, 1-stage, and 2-stage processes. With the flash only process, the reboiler fuel loss is not applicable.

Furthermore, in some current amine processes, the flash gas is compressed and sometimes treated before being sent to the fuel gas header. In the present process, the flash gas can be sent to the thermal oxidizing system uncompressed and untreated, thus reducing OSBL fuel gas requirements.

The reduced hydrocarbon losses and potential savings from not having to compress the flash gas results in a significant benefit for the overall process.

Figure 4:
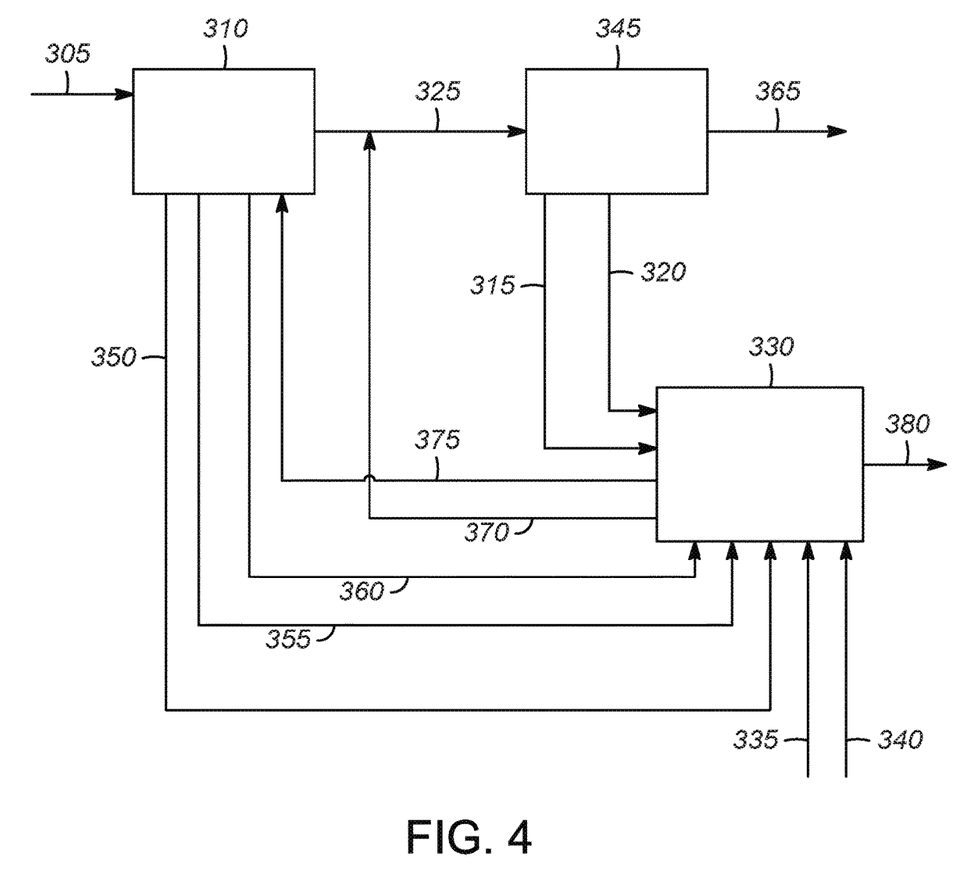
FIG. 4 is another embodiment of an integrated membrane separation system, acid gas removal system, and thermal oxidation system.

Alternatively, as shown in FIG. 4, the solvent based acid gas removal system 310 can be upstream of the membrane separation system 345, rather than downstream. This arrangement could be used to purify natural gas with a high $H_2S$ content. For example, the natural gas feed stream 305 may comprise 50 to 95 mol % methane and other hydrocarbons, 5 to 50 mol % $CO_2$, 1-5 mol % $H_2S$, and trace amounts of nitrogen and oxygen.

The natural gas feed stream 305 is sent to the acid gas removal system 310. Any suitable acid gas removal system 310 can be used, as described above. The content of acid gas streams 350, 355, 360 from the acid gas removal system 310 will depend on the acid gas removal system 310 used. For example, acid gas stream 350 may be a flash gas stream comprising 100 mol % methane and other hydrocarbons, and trace amounts of $CO_2$, $H_2S$, nitrogen, and oxygen. Acid gas stream 355 may be an acid gas $CO_2$ stream comprising 0.1 to 1 mol % methane and other hydrocarbons, 92 to 96 mol % $CO_2$, 5 to 8 mol % water, and trace amounts of $H_2S$, nitrogen, and oxygen. Acid gas stream 360 may be an acid gas $H_2S$ stream comprising 6 to 11 mol % methane and other hydrocarbons, 40 to 50 mol % $CO_2$, 32 to 44 mol % $H_2S$, 2 to 8 mol % water, and trace amounts of nitrogen and oxygen.

One or more of acid gas streams 350, 355, 360 can be fed to the thermal oxidizer system.

The purified natural gas stream 325 is sent to membrane separation system 345. The membrane separation system 345 may comprise one, two, or more membrane separation units.

The purified natural gas stream 325 is separated into a first permeate gas stream 315, a second permeate gas stream 320, and a purified natural gas product stream 365 in the membrane separation system 345. The first permeate gas stream 315 has a higher hydrocarbon content than the second permeate gas stream 320. For example, the first permeate gas stream 315 may comprise 13 to 22 mol % methane and other hydrocarbons, 78 to 87 mol % $CO_2$, and trace amounts of $H_2S$, nitrogen and oxygen. The second permeate gas stream 320 may comprise 4 to 8 mol % methane and other hydrocarbons, 92 to 96 mol % $CO_2$, and trace amounts of $H_2S$, nitrogen and oxygen.

The purified natural gas stream 325 is separated into a first permeate gas stream 315, a second permeate gas stream 320, and a purified natural gas product stream 365 in the membrane separation system 345. The first permeate gas stream 315 has a higher hydrocarbon content than the second permeate gas stream 320. For example, the first permeate stream 315 may comprise 13 to 22 mol % methane and other hydrocarbons, 78 to 87 mol % $CO_2$, and trace amounts of $H_2S$, nitrogen and oxygen. The second permeate stream 320 may comprise 4 to 8 mol % methane and other hydrocarbons, 92 to 96 mol % $CO_2$, and trace amounts of $H_2S$, nitrogen and oxygen.

The purified natural gas product stream 365 may be recovered. The purified natural gas product stream 365 may comprise 95 to 97 mol % methane and other hydrocarbons, 3 to 5 mol % $CO_2$, and trace amounts of $H_2S$, nitrogen and oxygen.

The first permeate gas stream 315 and the second permeate gas stream 320 are maintained as separate streams and sent to the thermal oxidizing system 330, as described above. Fuel gas stream 335 and combustion gas stream 340 are fed to the thermal oxidizing system 330. Fuel gas stream 335 may comprise 100 mol % methane and other hydrocarbons. Combustion gas stream 340 may comprise 79 mol % nitrogen and 21 mol % oxygen, for example.

The hydrocarbons in the first permeate gas stream 315 are used as a source of fuel for the burner, consequently reducing the amount of external fuel gas required for operating the thermal oxidizing system 330.

The flue gas stream 380 may comprise 0 mol % methane and other hydrocarbons, 30 to 40 mol % $CO_2$, 7 to 11 mol % water, 45 to 55 mol % nitrogen, and 3 mol % oxygen.

As described above, waste heat from the thermal oxidizing system 330 can be used as a source of heat for other parts of the process or other parts of the complex. For example, waste heat stream 370 can be used to heat the membrane preheater section of the membrane separation system 345. Alternatively, waste heat stream 375 can be used in the acid gas removal system 310 as a source of heat for column reboilers, for example.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

SPECIFIC EMBODIMENTS

While the following is described in conjunction with specific embodiments, it will be understood that this description is intended to illustrate and not limit the scope of the preceding description and the appended claims.

A first embodiment of the invention is a process for natural gas purification comprising passing a natural gas feed stream to a membrane separation system to separate the natural gas feed stream into a first permeate gas stream having a first hydrocarbon concentration, a second permeate gas stream having a second hydrocarbons concentration, the first concentration being higher than the second concentration, and a purified natural gas stream; introducing the first permeate gas stream into a thermal oxidizing system at a first position, the thermal oxidizing system comprising a combustion chamber with a fuel gas inlet, a combustion air inlet, two or more permeate stream inlets, and a burner positioned in the combustion chamber; introducing the second permeate gas stream to the thermal oxidizing unit at a second position; and recovering the purified natural gas stream. An embodiment of the invention is one, any or all of prior embodiments in this paragraph up through the first embodiment in this paragraph wherein the thermal oxidizing system uses less fuel gas than a thermal oxidizing unit in which a single permeate gas stream is introduced. An embodiment of the invention is one, any or all of prior embodiments in this paragraph up through the first embodiment in this paragraph wherein the thermal oxidizing unit is smaller than a thermal oxidizing unit in which a single permeate gas stream is introduced. An embodiment of the invention is one, any or all of prior embodiments in this paragraph up through the first embodiment in this paragraph wherein the membrane separation system includes two or more membrane separation units. An embodiment of the invention is one, any or all of prior embodiments in this paragraph up through the first embodiment in this paragraph further comprising removing acid gas from the purified natural gas stream using a solvent based acid gas removal process to form a purified natural gas product stream and an acid gas stream; passing the acid gas stream to the thermal oxidizing unit; and wherein recovering the purified natural gas stream comprises recovering the purified natural gas product stream. An embodiment of the invention is one, any or all of prior embodiments in this paragraph up through the first embodiment in this paragraph wherein removing the acid gas from the purified natural gas stream comprises treating the purified natural gas stream in a chemical solvent based acid gas removal process. An embodiment of the invention is one, any or all of prior embodiments in this paragraph up through the first embodiment in this paragraph wherein removing the acid gas from the purified natural gas stream comprises treating the purified natural gas stream in a physical solvent based acid gas removal process. An embodiment of the invention is one, any or all of prior embodiments in this paragraph up through the first embodiment in this paragraph wherein removing acid gas from the purified natural gas stream using the solvent based acid gas removal process to form the purified natural gas product stream and the acid gas stream comprises removing acid gas from the purified natural gas stream using the solvent based acid gas removal process to form the purified natural gas product stream, an acid gas stream, and a hydrocarbon off gas stream, the process further comprising passing the hydrocarbon off-gas stream to the thermal oxidizing unit. An embodiment of the invention is one, any or all of prior embodiments in this paragraph up through the first embodiment in this paragraph further comprising recovering waste heat from the thermal oxidizing unit. An embodiment of the invention is one, any or all of prior embodiments in this paragraph up through the first embodiment in this paragraph wherein the recovered waste heat is used in an acid gas removal process. An embodiment of the invention is one, any or all of prior embodiments in this paragraph up through the first embodiment in this paragraph wherein the recovered waste heat is used in a membrane preheater section of the membrane separation system. An embodiment of the invention is one, any or all of prior embodiments in this paragraph up through the first embodiment in this paragraph, further comprising at least one of sensing at least one parameter of the process and generating a signal or data from the sensing; generating and transmitting a signal; or generating and transmitting data.

A second embodiment of the invention is a process for natural gas purification comprising treating a natural gas feed stream in a solvent based acid gas removal system to form a purified natural gas stream and an acid gas stream; passing the purified natural gas stream to a membrane separation system to separate the purified natural gas stream into a first permeate gas stream having a first hydrocarbon concentration, a second permeate gas stream having a second hydrocarbons concentration, the first concentration being higher than the second concentration, and a purified natural gas product stream; introducing the first permeate gas stream into a thermal oxidizing unit at a first position, the thermal oxidizing unit comprising a chamber, a burner positioned in the chamber, a fuel gas inlet, a combustion air inlet, and two or more permeate stream inlets; introducing the second permeate gas stream to the thermal oxidizing unit at a second position; passing the acid gas stream to the thermal oxidizing unit; and recovering the purified natural gas product stream. An embodiment of the invention is one, any or all of prior embodiments in this paragraph up through the second embodiment in this paragraph wherein the thermal oxidizing unit uses less fuel gas than a thermal oxidizing unit in which a single permeate gas stream is introduced. An embodiment of the invention is one, any or all of prior embodiments in this paragraph up through the second embodiment in this paragraph wherein the thermal oxidizing unit is smaller than a thermal oxidizing unit in which a single permeate gas stream is introduced. An embodiment of the invention is one, any or all of prior embodiments in this paragraph up through the second embodiment in this paragraph wherein the membrane separation system includes two or more membrane separation units. An embodiment of the invention is one, any or all of prior embodiments in this paragraph up through the second embodiment in this paragraph wherein the solvent based acid gas removal system comprises a chemical solvent based acid gas removal system. An embodiment of the invention is one, any or all of prior embodiments in this paragraph up through the second embodiment in this paragraph wherein the solvent based acid gas removal system comprises a physical solvent based acid gas removal system. An embodiment of the invention is one, any or all of prior embodiments in this paragraph up through the second embodiment in this paragraph wherein treating the natural gas feed stream to the solvent based acid gas removal system to form the purified natural gas stream and the acid gas stream comprises removing acid gas from the natural gas feed stream using the solvent based acid gas removal system to form the purified natural gas stream, an acid gas stream, and a hydrocarbon off gas stream, the process further comprising passing the hydrocarbon off-gas stream to the thermal oxidizing unit. An embodiment of the invention is one, any or all of prior embodiments in this paragraph up through the second embodiment in this paragraph further comprising recovering waste heat from the thermal oxidizing unit; and one or more of using the recovered waste heat in the solvent based acid gas removal system; or using the recovered waste heat in a membrane preheater section of the membrane separation system.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for natural gas purification comprising:
    passing a natural gas feed stream to a membrane separation system to separate the natural gas feed stream into a first permeate gas stream having a first hydrocarbon concentration, a second permeate gas stream having a second hydrocarbon concentration, the first concentration being higher than the second concentration, and a purified natural gas stream;
    introducing the first permeate gas stream into a thermal oxidizing system at a first position, the thermal oxidizing system comprising a combustion chamber with a fuel gas inlet, a combustion air inlet, two or more permeate stream inlets, and a burner positioned in the combustion chamber;
    introducing the second permeate gas stream to the thermal oxidizing unit at a second position; and
    recovering the purified natural gas stream.

2. The process of claim 1 wherein the thermal oxidizing system uses less fuel gas than a thermal oxidizing unit in which a single permeate gas stream is introduced.

3. The process of claim 1 wherein the thermal oxidizing unit is smaller than a thermal oxidizing unit in which a single permeate gas stream is introduced.

4. The process of claim 1 wherein the membrane separation system includes two or more membrane separation units.

5. The process of claim 1 further comprising:
    removing acid gas from the purified natural gas stream using a solvent based acid gas removal process to form a purified natural gas product stream and an acid gas stream;
    passing the acid gas stream to the thermal oxidizing unit; and
    wherein recovering the purified natural gas stream comprises recovering the purified natural gas product stream.

6. The process of claim 5 wherein removing the acid gas from the purified natural gas stream comprises treating the purified natural gas stream in a chemical solvent based acid gas removal process.

7. The process of claim 5 wherein removing the acid gas from the purified natural gas stream comprises treating the purified natural gas stream in a physical solvent based acid gas removal process.

8. The process of claim 5 wherein removing acid gas from the purified natural gas stream using the solvent based acid gas removal process to form the purified natural gas product stream and the acid gas stream comprises removing acid gas from the purified natural gas stream using the solvent based acid gas removal process to form the purified natural gas product stream, an acid gas stream, and a hydrocarbon off gas stream, the process further comprising:
    passing the hydrocarbon off-gas stream to the thermal oxidizing unit.

9. The process of claim 1 further comprising recovering waste heat from the thermal oxidizing unit.

10. The process of claim 9 wherein the recovered waste heat is used in an acid gas removal process.

11. The process of claim 9 wherein the recovered waste heat is used in a membrane preheater section of the membrane separation system.

12. The process of claim 1, further comprising at least one of:
    sensing at least one parameter of the process and generating a signal or data from the sensing;
    generating and transmitting a signal; or
    generating and transmitting data.

13. A process for natural gas purification comprising:
    treating a natural gas feed stream in a solvent based acid gas removal system to form a purified natural gas stream and an acid gas stream;
    passing the purified natural gas stream to a membrane separation system to separate the purified natural gas stream into a first permeate gas stream having a first hydrocarbon concentration, a second permeate gas stream having a second hydrocarbons concentration, the first concentration being higher than the second concentration, and a purified natural gas product stream;
    introducing the first permeate gas stream into a thermal oxidizing unit at a first position, the thermal oxidizing unit comprising a chamber, a burner positioned in the chamber, a fuel gas inlet, a combustion air inlet, and two or more permeate stream inlets;
    introducing the second permeate gas stream to the thermal oxidizing unit at a second position;
    passing the acid gas stream to the thermal oxidizing unit; and
    recovering the purified natural gas product stream.

14. The process of claim 13 wherein the thermal oxidizing unit uses less fuel gas than a thermal oxidizing unit in which a single permeate gas stream is introduced.

15. The process of claim 13 wherein the thermal oxidizing unit is smaller than a thermal oxidizing unit in which a single permeate gas stream is introduced.

16. The process of claim 13 wherein the membrane separation system includes two or more membrane separation units.

17. The process of claim 13 wherein the solvent based acid gas removal system comprises a chemical solvent based acid gas removal system.

18. The process of claim 13 wherein the solvent based acid gas removal system comprises a physical solvent based acid gas removal system.

19. The process of claim 13 wherein treating the natural gas feed stream to the solvent based acid gas removal system to form the purified natural gas stream and the acid gas stream comprises removing acid gas from the natural gas feed stream using the solvent based acid gas removal system to form the purified natural gas stream, an acid gas stream, and a hydrocarbon off gas stream, the process further comprising:

passing the hydrocarbon off-gas stream to the thermal oxidizing unit.

20. The process of claim 13 further comprising:

recovering waste heat from the thermal oxidizing unit; and one or more of:

using the recovered waste heat in the solvent based acid gas removal system; or using the recovered waste heat in a membrane preheater section of the membrane separation system.

\* \* \* \* \*